United States Patent Office 2,956,047
Patented Oct. 11, 1960

2,956,047

PROCESS FOR COPOLYMERIZING VINYLIDENE CHLORIDE AND ACRYLONITRILE

William G. MacPherson, Bay City, and Clarence D. Parker, Gladwin, Mich., assignors to The Dow Chemical Company, Midland, Mich., a corporation of Delaware No Drawing. Filed Dec. 10, 1956, Ser. No. 627,129

2 Claims. (Cl. 260—85.5)

This invention relates to an improved process for copolymerizing vinylidene chloride and acrylonitrile in emulsion. More particularly it relates to such a process whereby the copolymer of the latex is of more uniform composition than has been heretofore possible.

The copolymers of vinylidene chloride and acrylonitrile are known to possess particularly useful properties which make these copolymers unusually well adapted for use as films, filamentary articles, coatings, and other continuous coherent articles. Thus, they are strong, tough, impermeable, relatively insoluble, and clear. However, those copolymers are notoriously sensitive to degradation when exposed to elevated temperatures so that the usual thermal fabrication methods, such as extrusion and molding, are not completely desirable. Because of their insolubility in common solvents, solution casting is not possible in many cases. Polymer latexes are known to be a commercially feasible means from which to fabricate thermoplastic articles generally, and latexes of the copolymers of vinylidene chloride and acrylonitrile have been prepared. Although these latexes have had some success, their full commercial potential has not been realized because of the heterogeneity of the copolymer architecture which results in articles of non-uniform properties, and also because of the difficulty of reproducing the copolymer composition from batch to batch. That heterogeneity results from the difference in reactivity or polymerization kinetics of different monomers during polymerization in a free radical system. It has been determined that acrylonitrile is the faster polymerizing monomer, so that in a given system the first polymer that is formed should be composed of a greater proportion of acrylonitrile than is present in the initial monomeric mixture. It should then follow that the concentration of acrylonitrile will gradually diminish during polymerization leaving the residual unpolymerized monomers richer in time with vinylidene chloride. That heterogeneity of polymer composition due to different reactivity has long been recognized. One of the techniques used to overcome that difficulty has been the continuous or intermittent addition of monomers. The initial charge was adjusted to compensate for the different reactivities by having a greater concentration of the slower polymerizing monomer than that desired in the polymer. Although that technique was eminently successful in increasing the homogeneity of copolymers prepared from most co-monomer pairs, it was unsuccessful when vinylidene chloride and acrylonitrile were polymerized in emulsion. Also such techniques require an added capital investment in equipment over the conventional batchwise equipment.

It is accordingly the principal object of this invention to provide an improved process for preparing aqueous latexes by the copolymerization of vinylidene chloride and acrylonitrile.

It is a further object to provide such a process whereby the copolymer is of homogeneous composition.

It is a still further object to provide such a process which is adapted for batchwise operation.

The above and related objects are achieved by means of a process wherein an aqueous phase comprising the total amount of water to be used in the polymerization charge, a water-soluble emulsifier, and a polymerization catalyst are charged into a vessel and brought to the polymerization temperature after which an initial increment of the comonomers of up to 20 percent by weight of the total weight of comonomers to be used is added in a ratio as will be later described. Polymerization is initiated and conducted at a pressure below the saturation pressure adding further increments of comonomers intermittently as needed to maintain the pressure constant. The saturation pressure may be defined as the vapor pressure of the polymerization system at the polymerization temperature. The improvement in the above process constituting the present invention is the discovery that constant composition copolymers are prepared from vinylidene chloride and acrylonitrile when the initial increment of comonomers is richer in acrylonitrile than that concentration of acrylonitrile desired in the copolymer. The phenomenon is in complete variance with the prior polymerization processes wherein the faster polymerizing monomer was always included in a smaller concentration than the copolymer composition desired.

The improved process is limited to the copolymerization of vinylidene chloride and acrylonitrile. It has been found that constant composition copolymers are not attained by means of this improvement when it is attempted to copolymerize with the vinylidene chloride such closely related monomers as the acrylate esters. When the acrylate esters are employed the prior means of using an initial increment of comonomers which is richer in the slower polymerizing monomer is necessary. Because vinylidene chloride and acrylonitrile appear to be unique in their polymerization characteristics in this process, it is believed that more than the water solubility of acrylonitrile is being compensated for in the initial increment. The improved process is operable over the whole range of concentrations of vinylidene chloride and acrylonitrile, although it should be apparent that it is of most value when it is desired to prepare constant composition copolymers which contain a predominant amount of vinylidene chloride.

The necessary adjuvants for aqueous emulsion polymerization reactions are well known. The aqueous phase usually contains an amount of an emulsifier that is capable of forming and maintaining a monomer-in-water and polymer-in-water emulsions. When vinylidene chloride and acrylonitrile are the comonomers used, as is the present case, the usual emulsifiers are selected from the anionic classification, typical examples of which are the alkyl aryl sulfonates, the sodium alkyl sulfates, and similar compounds. Although the concentration necessary to maintain the emulsion is dependent upon the particular polymerization system and the efficiency of the emulsifier, it is most common to use the emulsifier in a concentration of from about 0.5 to 5.0 percent of the weight of the monomers.

In emulsion polymerizations it is also necessary to include a small amount of a water-soluble, free-radical polymerization catalyst, such as hydrogen peroxide and potassium persulfate. Uusually the catalyst is employed in a concentration of from about 0.1 to 3 percent of the weight of the monomers.

It is preferred in this process that the total charge be in a phase ratio of from 1 to 2.5 parts by weight of water for every part of monomer phase. Although less than 1 part of water may be used, the latexes so produced are unusually sensitive to mechanical shear so the premature coagulation in the reactor may occur. When greater than 2.5 parts of water are used, the process becomes unattractive economically.

Emulsion polymerization reactions are usually agitated to form the initial monomer dispersion, to improve heat transfer and to prevent settling of any premature coagulum that might block discharge vents. For these reasons it is preferred that this process be carried out under agitation.

The temperature of polymerization will depend upon many factors, such as the comonomer ratio and catalyst used, the molecular weight of the polymer desired, and the physical limitations of the equipment being used. Most free radical, emulsion polymerizations are carried out at a temperature of from 30 degrees to 70 degrees centigrade and those temperatures are preferred in this process.

The comonomer composition of the initial increment will be dependent to a great extent upon the copolymer composition desired or, in other words, the percentage of acrylonitrile used in excess of that of the desired copolymer will be greatest when the desired copolymer is very high in vinylidene chloride and that percentage of excess acrylonitrile will decrease progressively as the desired copolymer composition becomes poorer in vinylidene chloride. It should be apparent that, although the percentage of excess acrylonitrile is greater with copolymers having a higher percentage of vinylidene chloride, the amount of excess acrylonitrile added will become greater when copolymers having a higher amount of acrylonitrile are to be produced.

It has been found with the normally crystalline vinylidene chloride-acrylonitrile polymer that the composition of the initial increment of the comonomers should preferably contain the acrylonitrile in an excess of from about 50 to about 100 percent by weight over that of the percentage of acrylonitrile forming desired copolymer composition. For example if one desires to make a copolymer having a composition of about 89 percent by weight vinylidene chloride and 11 percent by weight acrylonitrile the initial increment of comonomers should be in a weight ratio of about 81 percent vinylidene chloride and 19 percent acrylonitrile. When it is desired to make a copolymer having a composition of about 80 percent by weight vinylidene chloride and 20 percent by weight of acrylonitrile the initial increment should be in a weight ratio of about 72 percent vinylidene chloride and 28 percent acrylonitrile. It should be understood however, that the actual excess used will be dependent principally upon the copolymer composition desired and an investigator will be able to determine the magnitude of that excess by simple preliminary experiment.

The initial increment of comonomers should not constitute over 20 percent of the total weight of comonomers that are to be used. When it does constitute over 20 percent the composition of the final copolymer is significantly altered by the composition of the initial increment. Also an increment larger than 20 percent should be governed by the polymerization mechanism of the conventional batchwise and the heterogeneity present in such a method would result. Because of economic considerations it is preferred that the initial increment constitute at least 5 percent of the total weight of comonomers that are to be used.

In operation all of the aqueous phase including the catalyst is placed in the vessel and preferably is brought to the temperature of polymerization before addition of any monomers. This preheating of the aqueous phase results in greater reproducibility of reaction conditions from batch to batch. A still further aid to reproducibility is the evacuation of the reaction vessel with the aqueous phase and the sequential purging of that phase with an inert gas, such as nitrogen. Following the preheating the initial increment of the comonomers in the predetermined ratio is dispersed in the aqueous phase. The initial increment is allowed to attain its saturation pressure and to polymerize further to a maximum pressure caused by initiation of polymerization. Polymerization is continued until a pressure drop due to depletion of monomers is evidenced. The size of the pressure drop is determined by the pressure at which the reaction is to be run and that may be arbitrarily selected at any pressure below the saturation pressure. It is preferred to operate in a range of from 1 to 20 pounds per square inch below the saturation pressure because the reaction is easier to control in this range. To achieve uniform and more reproducible copolymer composition it is imperative that the reaction be run under starved conditions so that polymerization at the saturation pressure is not possible. It should be apparent that the greater the pressure differential between the operating pressure and the saturation pressure the more starved the reaction will be and consequently the slower will be the overall reaction rate.

After allowing the pressure drop to proceed to the desired pressure, the remainder of the comonomers is added at a rate to maintain the pressure substantially constant. This latter addition is made in a comonomer ratio that is identical to the desired copolymer composition and is not the same as the ratio of the initial increment of comonomers. The addition of the comonomers may be made by slow continuous addition or by the intermittent addition of small increments of comonomers. An especially convenient manner is to employ a pressure regulated control valve on the comonomer inventory so that when the polymerization pressure drops to very slightly below the desired level an additional increment of predetermined size of comonomer is added.

The size of any increment other than the initial increment which is added or the rate of continuous addition should be such that the pressure does not rise substantially over the desired pressure level. Thus, by adding small increments at a pressure slightly below the desired pressure while polymerization continues, a substantially constant pressure is maintained.

Using this process copolymers of vinylidene chloride and acrylonitrile having more constant and uniform composition are prepared than have been possible with any of the prior known polymerization procedures. This process eliminates the heterogeneity of composition caused by the presence of the copolymers rich in acrylonitrile at the beginning of the reaction and rich in vinylidene chloride at the end of the reaction which was the common result of those prior processes.

The operation and advantages of this process will be more apparent from the following illustrative example wherein all parts are by weight.

Into a jacketed and agitated polymerization vessel was charged 90 parts of water, 2.07 parts of the dihexyl ester of sodium sulfosuccinic acid and 0.70 part hydrogen peroxide and 8 p.p.m. of iron as ferric nitrate as catalyst. The vessel was evacuated of air and the charge heated to 57 degrees C. To the heated aqueous phase was then dispersed an initial increment consisting of 3.6 parts vinylidene chloride and 1.4 parts of acrylonitrile. Polymerization was allowed to proceed to a maximum pressure of 20 pounds per square inch and further to drop to 10 pounds per square inch. At that point 85 parts of a comonomeric material composed of 80 percent vinylidene chloride and 20 percent acrylonitrile were added portionwise to maintain the pressure at 10 pounds per square inch. As soon as all monomers had been added the reactor was vented and cooled. Samples of latex were taken at periodic intervals, and the polymer analyzed for percentage of acrylonitrile.

Two runs were made for comparison. In the first of those runs, hereinafter referred to as the first comparative run all conditions were the same as above except the 5 parts of initial increment consisted of 4 parts vinylidene chloride and 1 part of acrylonitrile. Samples were taken and analyzed as before.

In the second of the comparative runs all of the monomers were added initially and polymerized. This run represented conventional batchwise polymerization procedure. Samples were again taken and analyzed for acrylonitrile content.

The results of the sampling of each of the three runs will be found in the following table.

*Percent acrylonitrile in copolymer*

| Sample Number | Process of this Invention | First Comparative Run | Second Comparative Run |
|---|---|---|---|
| 1 | 19.50 | 12.70 | 23.00 |
| 2 | 20.25 | 13.90 | 23.70 |
| 3 | 20.60 | 16.00 | 19.60 |
| 4 | 20.90 | 17.55 | 18.90 |
| 5 | 20.50 | 21.70 | 19.00 |

The homogeneity of the copolymer prepared in accordance with this invention and the heterogeneity of the copolymers prepared by the prior methods are readily apparent from the above results.

We claim:

1. In the process for preparing normally crystalline copolymers of vinylidene chloride and acrylonitrile in aqueous dispersion wherein an aqueous phase consisting of all the water to be used, a polymerization catalyst, and an emulsifying agent is prepared, said aqueous phase is heated to the predetermined temperature of polymerization, then there is dispersed in said heated aqueous phase an initial increment of comonomers composed of at least 70 percent by weight vinylidene chloride with the remainder of acrylonitrile, said initial increment being of an amount of not over 20 percent of the total weight of comonomers to be added, the dispersion is allowed to attain its saturation pressure and the polymerization to proceed until the pressure in the vessel has dropped to an operating pressure which is at least one pound per square inch below said saturation pressure, and the polmerization is continued by adding the remainder of the comonomers in the ratio of that of the final copolymer at a rate so that said operating pressure remains substantially constant, the improvement comprising the dispersing of said initial increment of comonomers in a ratio in which the acrylonitrile is present in a concentration in excess of from 50 to 100 percent based on the percentage of acrylonitrile desired in the copolymer.

2. The process claimed in claim 1 wherein said initial increment of comonomers constitutes from 5 to 20 percent of the total weight of comonomers to be used.

References Cited in the file of this patent

UNITED STATES PATENTS

| | | |
|---|---|---|
| 2,100,900 | Fikentscher et al. | Nov. 30, 1937 |
| 2,496,384 | De Nie | Feb. 7, 1950 |
| 2,570,056 | Halbig | Oct. 2, 1951 |
| 2,606,894 | Pitzl | Aug. 12, 1952 |
| 2,610,173 | Ham | Sept. 9, 1952 |
| 2,843,572 | Wooten et al. | July 15, 1958 |
| 2,855,389 | Sparks | Oct. 7, 1958 |